United States Patent
Hemingway et al.

(10) Patent No.: US 11,941,825 B2
(45) Date of Patent: Mar. 26, 2024

(54) METHOD AND APPARATUS FOR REGISTERING IMAGE VOLUMES

(71) Applicant: CANON MEDICAL SYSTEMS CORPORATION, Otawara (JP)

(72) Inventors: Ewan Hemingway, Edinburgh (GB); Paul Thomson, Edinburgh (GB); John Hipwell, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 80 days.

(21) Appl. No.: 17/452,582

(22) Filed: Oct. 28, 2021

(65) Prior Publication Data

US 2023/0138451 A1    May 4, 2023

(51) Int. Cl.
*G06T 7/30* (2017.01)
*G06T 3/20* (2006.01)
(Continued)

(52) U.S. Cl.
CPC .................. *G06T 7/30* (2017.01); *G06T 3/20* (2013.01); *G06T 3/60* (2013.01); *G06T 7/68* (2017.01);
(Continued)

(58) Field of Classification Search
CPC . G06T 2207/30016; G06T 2207/10088; G06T 7/0012; G06T 7/11; G06T 2207/10081; G06T 2207/10072; G06T 2207/20128; G06T 2207/30004; G06T 7/0014; G06T 7/30; G06T 2207/20084; G06T 3/0068; G06T 2207/30096; G06T 7/149; G06T 7/68; G06T 2210/41;
(Continued)

(56) References Cited

U.S. PATENT DOCUMENTS 6,009,212 A * 12/1999 Miller ................... G06T 3/0081
382/294
10,163,040 B2   12/2018 Poole et al.
(Continued)

FOREIGN PATENT DOCUMENTS

CN    108852287 A    11/2018
CN    110223331 A  *  9/2019  ............. G06T 7/136
(Continued)

OTHER PUBLICATIONS

X. Liu, R. T. Ogden, C. Imielinska, A. Laine, E. S. Connolly and A. L. D'Ambrosio, "Statistical Bilateral Asymmetry Measurement in Brain Images," 2006 International Conference of the IEEE Engineering in Medicine and Biology Society, New York, NY, USA, 2006, pp. 1441-1445 (Year: 2006).*
(Continued)

*Primary Examiner* — Ian L Lemieux
*Assistant Examiner* — Woo C Rhim
(74) *Attorney, Agent, or Firm* — Oblon, McClelland, Maier & Neustadt, L.L.P.

(57) ABSTRACT

A medical image processing apparatus includes processing circuitry configured to receive first volume data and second volume data; set a first symmetry plane for the first volume data and a second symmetry plane for the second volume data; and conduct a registration of the first volume data and the second volume data based on the first symmetry plane and the second symmetry plane.

18 Claims, 9 Drawing Sheets

(51) Int. Cl.
*G06T 3/60* (2006.01)
*G06T 7/68* (2017.01)

(52) U.S. Cl.
CPC ........... *G06T 2207/10081* (2013.01); *G06T 2207/20084* (2013.01); *G06T 2207/30016* (2013.01)

(58) Field of Classification Search
CPC ....... G06T 2200/04; G06T 2207/10136; G06T 7/33; G06T 7/337; G06T 3/20; G06T 3/60; A61B 6/032; A61B 5/0042; A61B 2576/026; A61B 6/03; A61B 5/055; A61B 6/037; A61B 6/501; G06V 2201/031; G06V 2201/03; G06V 10/754; G06V 10/82; G06V 10/24
See application file for complete search history.

(56) References Cited

U.S. PATENT DOCUMENTS

| | | | |
|---|---|---|---|
| 2005/0141757 A1* | 6/2005 | Ayache | G06T 7/30 382/128 |
| 2007/0003117 A1* | 1/2007 | Wheeler | G06T 7/0012 382/128 |
| 2007/0014453 A1* | 1/2007 | Nowinski | G06T 7/35 382/128 |
| 2008/0021502 A1* | 1/2008 | Imielinska | A61B 6/501 607/1 |
| 2009/0028403 A1* | 1/2009 | Bar-Aviv | G06T 7/0012 382/128 |
| 2010/0128953 A1* | 5/2010 | Ostrovsky-Berman | G06T 7/35 382/131 |
| 2010/0129005 A1* | 5/2010 | Tao | G01R 33/4833 382/291 |
| 2012/0016269 A1* | 1/2012 | Moctezuma De La Barrera | A61B 6/037 600/595 |
| 2013/0182008 A1* | 7/2013 | Zhou | G06T 3/0068 345/629 |
| 2013/0182925 A1* | 7/2013 | Razeto | A61B 6/504 382/131 |
| 2016/0042524 A1* | 2/2016 | Wenzel | A61B 6/501 382/128 |
| 2016/0058306 A1* | 3/2016 | Kawasaki | A61B 5/0042 600/407 |
| 2016/0196642 A1* | 7/2016 | Matthews | G06T 7/11 382/128 |
| 2018/0025255 A1* | 1/2018 | Poole | G06V 10/7788 382/131 |
| 2018/0374193 A1* | 12/2018 | Park | G06T 7/0012 |
| 2020/0090328 A1 | 3/2020 | Takei et al. | |
| 2021/0264623 A1* | 8/2021 | Tandon | A61B 5/6868 |
| 2022/0044435 A1* | 2/2022 | Smeets | G06T 7/13 |
| 2023/0129056 A1* | 4/2023 | Hemingway | G06T 7/11 382/128 |

FOREIGN PATENT DOCUMENTS

| | | | |
|---|---|---|---|
| CN | 110223331 A | | 9/2019 |
| CN | 113344892 A * | | 9/2021 |
| EP | 3 798 971 A1 | | 3/2021 |
| WO | WO-2007095284 A2 * | 8/2007 | ............ A61B 6/032 |
| WO | WO 2010/095508 A1 | | 8/2010 |

OTHER PUBLICATIONS

X. Liu, C. Imielinska, A. Francis and L. A. D'Ambrosio, "Symmetry Based Multi-modality Registration of the Brain Imagery," 2007 IEEE International Symposium on Signal Processing and Information Technology, Giza, Egypt, 2007, pp. 807-812 (Year: 2007).*

Yanxi Liu, R. T. Collins and W. E. Rothfus, "Robust midsagittal plane extraction from normal and pathological 3-D neuroradiology images," in IEEE Transactions on Medical Imaging, vol. 20, No. 3, pp. 175-192, Mar. 2001 (Year: 2001).*

Raina et al., "Exploiting bilateral symmetry in brain lesion segmentation", http://arxiv.org/abs/1907.08196; Jul. 2019, 10 pages.

Cicconet et al., "Finding Mirror Symmetry via Registration and Optimal Symmetric Pairwise Assignment of Curves", 2017 IEEE International Conference on Computer Vision Workshops (ICCVW), Oct. 22-29, 2017, 10 pages.

Shen et al., "Efficient Symmetry-Driven Fully Convolutional Network for Multimodal Brain Tumor Segmentation", 2017 IEEE International Conference on Image Processing (ICIP), Sep. 17-20, 2017, 6 pages.

Wang et al., "A Deep Symmetry Convnet for Stroke Lesion Segmentation", 2016 IEEE International Conference on Image Processing (ICIP), Sep. 25-28, 2016, 5 pages.

Rogelj et al., "Symmetric image registration", Medical Image Analysis, vol. 10, issue 3, 2006, pp. 484-493.

Yang et al., "Brain MR Multimodal Medical Image Registration Based on Image Segmentation and Symmetric Self-similarity", KSII Transactions on Internet and Information Systems, vol. 14, No. 3, Mar. 31, 2020, 21 pages.

* cited by examiner

US 11,941,825 B2

METHOD AND APPARATUS FOR REGISTERING IMAGE VOLUMES

FIELD

Embodiments described herein relate generally to an image processing method and apparatus, for example a method of conducting a registration of image volumes.

BACKGROUND

It is known to perform medical imaging of the head for use in medical applications, for example in the detection and treatment of stroke.

In contexts such as stroke, accurate detection of a symmetry of the head and respecting the symmetry of the head may be crucial. Accurate detection of symmetry of the head may allow an accurate comparison to be made between the hemispheres of the head, for example to detect ischemia.

Registration of scan volumes may often be required. An atlas volume may be registered to a novel patient volume, for example to perform an atlas-based segmentation of the novel patient volume. A novel patient volume may be registered to a mirrored version of the novel patient volume to compare hemispheres of the brain, for example to detect ischemia.

It has been found that a naïve approach to the registration of volumes, for example a rigid registration, may fail too often for use in clinical applications. In one example, performing a registration of 327 pairs of volumes using a naïve approach resulted in 270 ideal cases, 44 cases that were considered to be only adequate, and 13 failures of registration.

If the registration fails, subsequent steps such as segmentation may also fail. For example, consider a case in which an atlas-to-novel registration is to be performed. If an initial alignment of the atlas volume and novel volume is poor, the atlas to novel registration may fail. It is noted that poor initial alignment may be common with stroke patients, since they may be unable to maintain a standardized position of the head.

If the registration fails, an impact may be that a subsequent atlas-based segmentation and/or ASPECTs (Alberta stroke programme early CT score) scoring method to be performed using the registered volumes may also fail.

In some methods, a convolutional neural network (CNN) is used to compare the hemispheres of the head. A failure in registration may mean that the CNN is unable to compare intensities between hemispheres. Registration quality may therefore be important for comparing hemispheres in a CNN.

Even if the registration has not failed, the performance of the CNN may be impacted if a given patient exhibits left-right asymmetry within the range of normal, i.e. non-stroke related, anatomical variation.

Robust registration methods may be considered to be crucial for effective, fully automatic algorithms.

BRIEF DESCRIPTION OF THE DRAWINGS

Embodiments are now described, by way of non-limiting example, and are illustrated in the following figures, in which.

DETAILED DESCRIPTION

Certain embodiments provide a medical image processing apparatus comprising processing circuitry configured to: receive first volume data and second volume data; set a first symmetry plane for the first volume data and a second symmetry plane for the second volume data; and conduct a registration of the first volume data and the second volume data based on the first symmetry plane and the second symmetry plane.

Certain embodiments provide a medical image processing method comprising: receiving first volume data and second volume data; determining a first symmetry plane for the first volume data and a second symmetry plane for the second volume data; and conducting a registration of the first volume data and the second volume data based on the first symmetry plane and the second symmetry plane.

Certain embodiments provide a medical image processing apparatus comprising processing circuitry configured to: receive volume data; set a symmetry plane for the volume data; generate mirrored volume data by mirroring the volume data using the symmetry plane; and generate symmetrized volume data based on the volume data and the mirrored volume data.

Certain embodiments provide a medical image processing method comprising: receiving volume data; setting a symmetry plane for the volume data; generating mirrored volume data by mirroring the volume data using the symmetry plane; and generating symmetrized volume data based on the volume data and the mirrored volume data.

Figure 1:
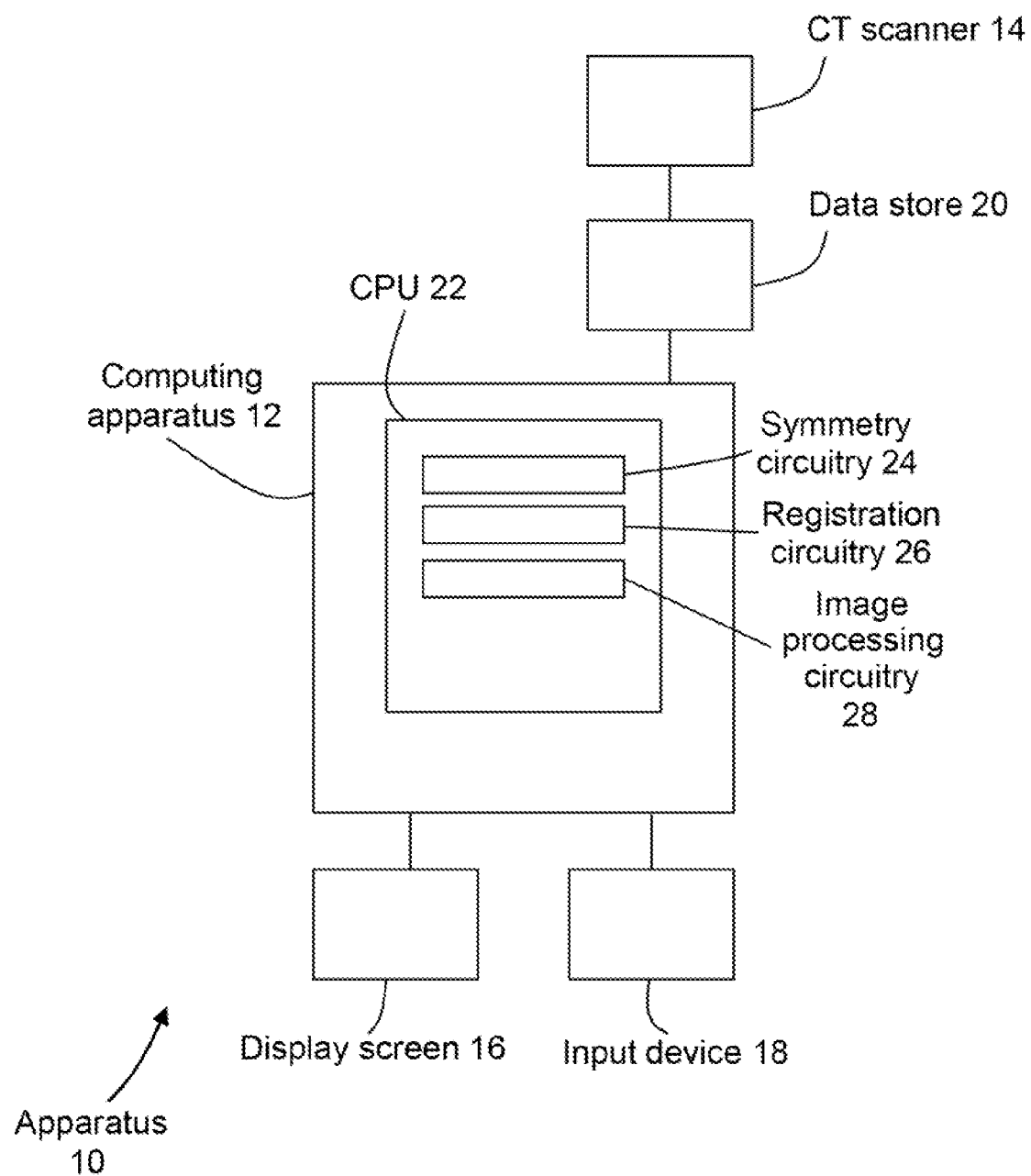
FIG. 1 is a schematic illustration of an apparatus in accordance with an embodiment.

An image data processing apparatus 10 according to an embodiment is illustrated schematically in FIG. 1.

The image data processing apparatus 10 comprises a computing apparatus 12, in this case a personal computer (PC) or workstation, which is connected to a scanner 14 via a data store 20.

The medical image processing apparatus 10 further comprises one or more display screens 16 and an input device or devices 18, such as a computer keyboard, mouse or trackball.

In the present embodiment, the scanner 14 is a CT (computed tomography) scanner which is configured to obtain volumetric CT scans. The scanner 14 is configured to generate image data that is representative of at least one anatomical structure of a patient or other subject. The image data comprises a plurality of voxels each having a corresponding data value, which in the case of CT scanning is an intensity value, for example a value in Hounsfield units.

In the present embodiment, the anatomical structure is the brain. In other embodiments, the anatomical structure may be any anatomical structure that is substantially symmetrical. A substantially symmetrical anatomical structure may be an anatomical structure that, in a normal patient and in the absence of pathology, may be expected to look similar to its mirror image.

A substantially symmetrical anatomical structure may also be referred to generally as a symmetrical anatomical structure. For example, the brain may be described as a symmetrical structure even though there may be differences between the left and right sides of the brain such that the symmetry of the brain is not exact.

A substantially symmetrical anatomical structure may be substantially symmetrical about a symmetry plane. The symmetry plane may be a sagittal plane which divides left and right sides of the human body. Examples of substantially symmetrical anatomical structures may include a brain, a skull, a jaw, a vertebra, a spine, a pelvis, a bladder, a ribcage. In some embodiments, the substantially symmetrical anatomical structure may comprise a pair of related anatomical structures, for example a pair of eyes, a pair of ears, a pair of lungs, a pair of kidneys, a pair of joints, a pair of limbs, a pair of hands, a pair of feet, a pair of shoulders.

In alternative embodiments, the CT scanner 14 may be replaced or supplemented by a scanner configured to obtain two-dimensional or three-dimensional imaging data in any other imaging modality, for example a CT scanner, cone-beam CT scanner, MRI (magnetic resonance imaging) scanner, X-ray scanner, ultrasound scanner, PET scanner (positron emission tomography) or SPECT (single photon emission computed tomography) scanner. In one example, the CT scanner 14 is replaced by a scanner configured to obtain two-dimensional planar radiographs.

In the present embodiment, volumetric imaging data sets obtained by the CT scanner 14 are stored in memory 20 and subsequently provided to computing apparatus 12. In an alternative embodiment, volumetric imaging data sets are supplied from a remote data store (not shown) which may form part of a Picture Archiving and Communication System (PACS). The memory 20 or remote data store may comprise any suitable form of memory storage.

Computing apparatus 12 provides a processing resource for automatically or semi-automatically processing imaging data sets, and comprises a central processing unit (CPU) 22. The computing apparatus 12 may also comprise one or more graphical processing units (CPUs, not shown in FIG. 1).

The computing apparatus 12 includes symmetry circuitry 24 configured to determine symmetry, registration circuitry 26 configured to perform one or more registration procedures, and image processing circuitry 28 configured to perform image processing, for example segmentation or scoring.

In the present embodiment, the circuitries 24, 25, 26, 28 are each implemented in computing apparatus 12 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

In the present embodiment, the circuitries 24, 26, and 28 are each implemented in computing apparatus 12 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The apparatus of FIG. 1 is configured to perform processes as shown in overview in FIGS. 2 to 7.

Figure 2:
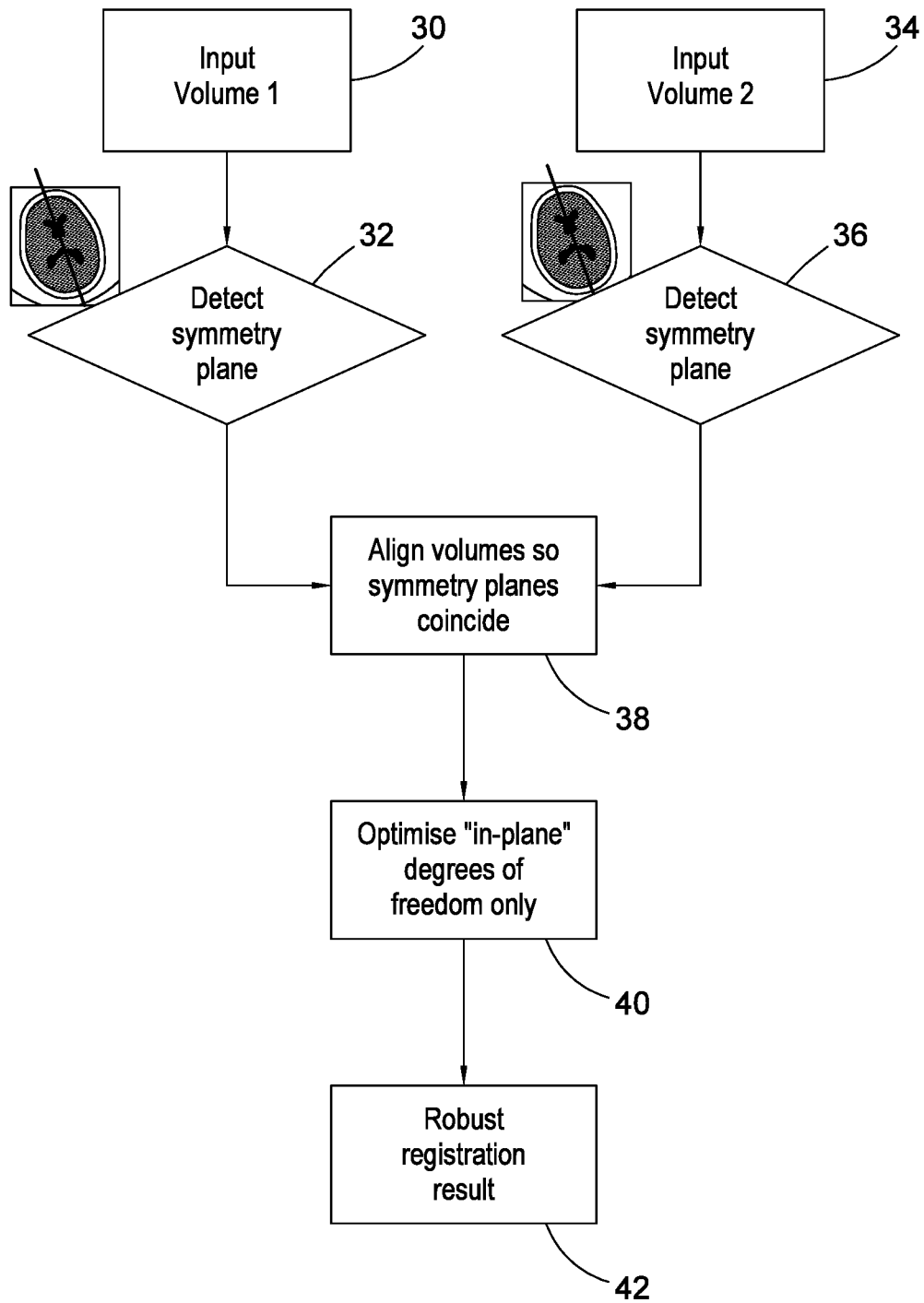
FIG. 2 is a flow chart illustrating in overview a method in accordance with an embodiment.

FIG. 2 is a flow chart illustrating in overview a registration method in accordance with an embodiment. The method of FIG. 2 is performed by the apparatus 10 of FIG. 1.

At stage 30, the symmetry circuitry 24 receives a first input volume. The first input volume is a novel volume that is representative of a head of a patient, for example a volume obtained by scanning the head of the patient using the scanner 14. The novel volume comprises a three-dimensional array of voxels, each voxel having an associated intensity value.

At stage 32, the symmetry circuitry 24 performs a symmetry detection procedure to detect a symmetry plane in the novel volume. The detecting of the symmetry plane is performed automatically. The symmetry plane is a plane that divides the volume into first and second sections such that the first section is similar to a mirrored version of the second section. In the case of the head, there is an anatomical symmetry between a left half of the head and a right half of the head. The symmetry plane divides the head into a left half comprising a left hemisphere of the brain and a right half comprising a right hemisphere of the brain. Other anatomical structures may also have a right-left symmetry such that a symmetry plane can be defined that divides a left half and a right half.

A first step of the symmetry detection procedure is to mirror the novel volume using a predefined mirror plane to obtain a mirrored novel volume. In the embodiment of FIG. 2, the predefined mirror plane is defined in the coordinate space of the novel volume, which corresponds to a coordinate space of the scan acquisition used to acquire the novel volume. The coordinate space of the novel volume comprises an x axis in a right-left direction, a y axis in an anterior-posterior direction and a z axis in an inferior-superior direction. The x, y and z axes are orthogonal to each other. The predefined mirror plane is defined as a y-z plane positioned midway across the volume in the x direction. The novel volume is mirrored by reversing x axis coordinate values such that voxels that were previously on the right are now on the left and vice versa.

It is noted that when the head is scanned, the radiographer may attempt to position the patient such that the patient's head aligns with the x, y, z coordinate system of the scan acquisition. However, in some cases it may not be possible to position the patient's head in such a way that it is well aligned with the coordinate system, for example if the patient is a stroke patient. Furthermore, even if the patient's head can be aligned fairly well, it may be unlikely that the alignment is exact.

In other embodiments, any suitable mirror plane may be used to obtain the mirrored volume.

A second step of the symmetry detection procedure is to use the registration circuitry 26 to register the novel volume and the mirrored novel volume to obtain a transform relating a coordinate space of the novel volume and to a coordinate space of the mirrored novel volume. Registering the novel volume and the mirrored novel volume may be described as a self-registration. In the embodiment of FIG. 2, the registration used in the symmetry detection procedure is a rigid registration as described in Cicconet et al, Finding Mirror Symmetry via Registration and Optimal Symmetric Pairwise Assignment of Curves, 2017 IEEE International Conference on Computer Vision Workshops (ICCVW), 22-29 Oct. 2017, which is hereby incorporated by reference. In other embodiments, any suitable form of rigid registration may be used.

The registration circuitry 26 defines an image similarity measure that is representative of a similarity between the novel volume and the mirrored novel volume, and iterates the relative position of the novel volume and the mirrored novel volume to maximize the similarity measure. The similarity measure may comprise, for example, mutual information, cross-correlation or least squares.

In some embodiments, the registration of the novel volume and the mirrored novel volume is performed for one hemisphere, i.e. one side of the predefined mirror plane, and a resulting transform may be inverted and mirrored to provide a transform for the other hemisphere, i.e. the other side of the predefined mirror plane.

An output of the second step is the transform relating the coordinate space of the novel volume and the coordinate space of the mirrored novel volume.

In a third step of the symmetry detection procedure, the symmetry detection circuitry 24 infers the symmetry plane from the transform. For example, the symmetry plane may be inferred using a method as described in Cicconet et al, Finding Mirror Symmetry via Registration and Optimal Symmetric Pairwise Assignment of Curves, 2017 IEEE International Conference on Computer Vision Workshops (ICCVW), 22-29 Oct. 2017.

In other embodiments, any suitable symmetry detection procedure may be used to set the symmetry plane for the novel volume. The symmetry plane may be detected within the novel volume. Alternatively, a pre-determined symmetry plane may be used and stage 32 may be omitted. For example, a pre-determined symmetry plane may be received along with the novel volume. In some embodiments, the symmetry plane is set manually rather than being automatically determined. The symmetry plane may be set based on an input from a user.

At stage 34, the symmetry circuitry 24 receives a second input volume. The second volume is an atlas volume which comprises or forms part of an anatomical atlas. An anatomical atlas provides a representative anatomy in which features such as organs and other anatomical structures may be identified and named. The anatomical atlas may be based on one or more human subjects. The atlas volume comprises a three-dimensional array of voxels, each voxel having an associated intensity value. Some or all of the voxels may be labelled with anatomical structures to which they belong, providing a segmentation of the atlas volume.

At stage 36, the symmetry circuitry 24 performs a symmetry detection procedure to detect a symmetry plane in the atlas volume. The detecting of the symmetry plane is performed automatically. In the present embodiment, the symmetry detection procedure used to determine the symmetry plane in the atlas volume includes the same steps as the symmetry detection procedure that was used to determine the symmetry plane in the novel volume. In other embodiments, a different symmetry detection procedure may be used. In further embodiments, the symmetry plane of the atlas volume may be pre-determined and stage 36 may be omitted. For example, the symmetry plane may already be defined in the atlas volume. The symmetry circuitry 24 may set the symmetry plane for the atlas volume by receiving the symmetry plane along with the atlas volume.

At stage 38, the registration circuitry 26 performs an alignment procedure in which the registration circuitry 26 aligns the atlas volume and the novel volume such that the determined symmetry plane of the novel volume and the determined symmetry plane of the atlas volume are coincident. The alignment procedure may also be described as a first registration or first partial registration.

In the present embodiment, the registration circuitry 26 uses the determined symmetry plane of the novel volume to determine a transform between the coordinate system of the novel volume and a coordinate system in which the symmetry plane is a y-z plane positioned in the middle of the x axis. An orientation in which the symmetry plane is a y-z plane positioned in the middle of the x axis may be described as a contralateral orientation. The registration circuitry 26 uses the determined transform to align the novel volume such that the symmetry plane of the novel volume becomes a y-z plane positioned in the middle of the x axis.

The registration circuitry 26 uses the determined symmetry plane of the atlas volume to determine a transform between the coordinate system of the atlas volume and a coordinate system in which the symmetry plane is a y-z plane positioned in the middle of the x axis. The registration circuitry 26 uses the determined transform for the atlas volume to align the atlas volume such that the symmetry plane of the atlas volume becomes a y-z plane positioned in the middle of the x axis.

In some embodiments, the atlas volume is already orientated such that the symmetry plane is a y-z plane positioned in the middle of the x axis, and no transforming of the atlas volume is performed at this stage.

In further embodiments, the registration circuitry 26 determines the transform or transforms that are required to align the novel volume and atlas volume, but does not transform the novel volume and/or atlas volume.

In other embodiments, the registration circuitry 26 may transform the novel volume and the atlas volume to any suitable orientation. The registration circuitry 26 may transform the novel volume and the atlas volume to conform with any suitable standardized orientation, for example in accordance with any suitable radiological standard. In further embodiments, the registration circuitry 26 may transform the novel volume to the coordinate space of the atlas volume such that the symmetry plane of the novel volume is coincident with the symmetry plane of the atlas volume, or may transform the atlas volume to the coordinate space of the novel volume such that the symmetry plane of the atlas volume is coincident with the symmetry plane of the novel volume.

In further embodiments, the alignment procedure comprises determining a transform between the novel volume and the atlas volume but does not comprise transforming the novel volume or the atlas volume in accordance with the determined transform. The determined transform between the novel volume and the atlas volume is used as an input to the constrained registration procedure.

At stage 40, the registration circuitry 26 performs a registration procedure, which may be described as a constrained registration procedure. The registration procedure may also be described as a second registration or second partial registration, where a combination of the alignment procedure of stage 38 and the registration procedure of stage 40 together form a full registration.

In the present embodiment, the registration procedure comprises a rigid registration. In other embodiments, the registration procedure may comprise a non-rigid registration, for example using a symmetric demons method.

In the present embodiment, the registration procedure of stage 40 is performed on the novel volume and atlas volume after the novel volume and atlas volume have been transformed such that the symmetry planes of the novel volume and atlas volume are aligned. The registration procedure is constrained to maintain the symmetry plane of the novel volume and the symmetry plane of the atlas volume such that they are coincident.

In further embodiments, the novel volume and atlas volume are not transformed at stage 38. The novel volume and atlas volume are used as inputs to stage 40 along with any transform determined at stage 38.

The registration circuitry 26 defines a similarity measure that is representative of a similarity between the novel volume and the atlas volume. For example, the similarity measure may be based on a similarity between intensities in the novel volume and intensities in the atlas volume. The similarity measure may comprise, for example, mutual information, cross-correlation or least squares.

The registration circuitry 26 iterates the relative position of the novel volume and the atlas volume to maximize the similarity measure. The iterating of the relative position is constrained in that the symmetry plane of the novel volume and the symmetry plane of the atlas volume must remain aligned.

The aligning of the atlas volume and the novel volume such that their symmetry planes coincide means that three degrees of freedom are constrained. The three degrees of freedom that are constrained are translation along the x axis, rotation around the y axis, and rotation around the z axis. Once the symmetry planes are aligned, any change in x position, rotational angle around they axis, or rotational angle around the z axis would result in the symmetry planes becoming no longer aligned. However, there are many possible y axis positions, z axis positions, and rotational angles around the x axis that maintain alignment between the symmetry planes. The registration procedure optimizes the remaining three degrees of freedom which are not constrained by the symmetry plane alignment. The remaining three degrees of freedom comprise translation along the y axis, translation along the z axis, and rotation around the x axis.

The degrees of freedom optimized at stage 40 comprise in-plane degrees of freedom only. Other degrees of freedom have already been fixed in previous stage 38 by aligning the symmetry planes such that they are coincident.

In other embodiments, the registration procedure of stage 40 allows small variations in at least one of translation along the x axis, rotation around they axis, and rotation around the z axis. The translation along the x axis, rotation around they axis, and rotation around the z axis resulting from aligning the symmetry planes are assumed to be correct or nearly correct, but the optimization performed in stage 40 can made minor adjustments.

An output of the registration procedure is a transform between the novel volume and the atlas volume. The transform may comprise a concatenation of a transform obtained at stage 38 and a transform obtained at stage 40.

Values for translation in x and rotation around y and z are obtained from the alignment of symmetry planes at stage 38. Values for translation in y and z and rotation around x are obtained from the registration procedure of stage 40.

In the present embodiment, the registration circuitry 26 transforms the novel volume and/or the atlas volume in accordance with the determined transform.

At stage 42, the registration circuitry 26 outputs a result of the registration procedure. The result may comprise the transform relating the coordinate space of the novel volume and the coordinate space of the atlas volume. The result may comprise the transformed novel volume and/or atlas volume.

The result of the registration procedure may be considered to be robust. By first aligning symmetry planes before optimizing further degrees of freedom, a result obtained may be more robust than a result that would be obtained by optimizing all six degrees of freedom at once.

After stage 42, the image processing circuitry 28 may use the registration result of stage 42 to perform any suitable image processing task, for example to perform a segmentation or a scoring, for example an ASPECTS scoring. A segmentation of the atlas volume may be transferred to the novel volume using the registration of the novel volume and the atlas volume.

The image processing circuitry 28 may apply a trained model to the registered volumes to perform the image processing task.

By using the symmetry planes to constrain the registration procedure, a quality and robustness of the resulting registration may be improved. An improved method of registering two heads together may be obtained. In further embodiments, the registration of any symmetrical anatomy may be improved.

FIG. 2 provides a method in which a registration is divided into two parts. In the first part, a symmetry plane of each volume is found and the symmetry planes are aligned. In the second part, the remaining degrees of freedom are optimized.

Improved registration may provide improved automation and improved performance in tasks that depend on registration, for example segmentation and ASPECTs scoring. Intensities may be reliably compared between hemispheres. A trained model, for example a CNN, that depends on symmetry being available may be more useful if good symmetry is obtained.

In one example as mentioned above, performing a registration of 327 pairs of volumes using a naïve approach resulted in 270 ideal cases, 44 cases that were considered to be only adequate, and 13 failures of registration. A corresponding example was performed using the method of FIG. 2, which resulted in 294 ideal cases, 31 cases that were considered to be only adequate, and only 2 failures of registration. Registration performance was improved by using the method of FIG. 2.

One example of a registration using the method of FIG. 2 provided good alignment as viewed in all of axial slices, coronal slices and sagittal slices. In an example of a failure case using a different and poorer method of registration, poor alignment was observed in all of axial slices, coronal slices and sagittal slices.

In the embodiment of FIG. 2, the volumes registered together are a novel volume and an atlas volume. In other embodiments, any suitable volumes may be registered together. It may be the case that neither of the volumes to be registered is an atlas volume.

In some embodiments, a volume may be registered with a mirrored version of the same volume, for example using non-rigid registration. Registering a volume with a mirrored version of the same volume may be used to compare hemispheres of the brain, for example to detect ischemia.

For example, in one embodiment the symmetry circuitry 24 receives a first input volume. The first input volume is a novel volume that is representative of a head of a patient, for example a volume obtained by scanning the head of the patient using the scanner 14. The novel volume comprises a three-dimensional array of voxels, each voxel having an associated intensity value. The symmetry circuitry 24 performs a symmetry detection procedure to detect a symmetry plane in the novel volume.

The symmetry circuitry 24 obtains a second input volume that is a mirrored version of the first input volume. For example, the symmetry circuitry 24 may obtain the second input volume by mirroring the first input volume across the detected symmetry plane.

Alternatively, the symmetry circuitry 24 may receive a pre-determined symmetry plane along with the first input volume and/or second input volume.

The registration circuitry 26 aligns the first input volume and the second input volume based on their determined symmetry planes.

The registration circuitry 26 performs a registration procedure comprising a non-rigid registration between the first input volume and the second input volume, where the second input volume is the mirrored version of the first input volume. The non-rigid registration is performed in order to compare the left and right hemispheres of the first input volume. In this embodiment, the registration is constrained such that a deformation is not permitted to move material across the symmetry plane.

Naïvely, one may consider that there are N degrees of freedom for a non-rigid registration of a volume having N voxels. However, the non-rigid registration of the first input volume and second (mirrored) input volume is constrained by the mirroring across the contralateral plane. The non-rigid registration may be considered to have N/2 degrees of freedom corresponding to the number of voxels in one hemisphere.

In a further embodiment, a cost function of the non-rigid registration optimization penalizes, but does not forbid, deformations that move material across the symmetry plane. In further embodiments, any suitable constraints on the non-rigid registration may be used.

In some embodiments, a registration of the volume and the mirrored version of the volume may be performed for a single hemisphere and a resulting transform may be inverted and mirrored to provide a transform for the other hemisphere. Performing the registration on a single hemisphere may provide a more efficient registration, which may be less resource-intensive.

Any suitable symmetric objects may be registered together. The volumes may include any suitable data, which may not be medical data.

In the embodiment of FIG. 2, the symmetry planes are aligned at stage 38. The relative positions of the symmetry planes in x and rotational angles around y and around z are fixed by the alignment of the symmetry planes and are not changed by the registration procedure of stage 40.

In other embodiments, the symmetry planes are determined and aligned as described above with reference to stages 30 to 38. A registration procedure is then performed. The symmetry planes are not constrained to be coincident during the registration procedure. However, a cost function of the registration includes a measure of the amount by which the symmetry planes deviate from coincidence. Deviations from coincidence are penalized in an optimization of the registration procedure, such that greater deviations from a coincident position are penalized by a greater amount. By applying a penalty for deviation from coincidence, the registration may be encouraged to stay as close as possible to the alignment of the symmetry planes that was determined at stage 38.

For example, in one embodiment, gradient descent is used. Each update at each iteration of the gradient descent receives a respective weight. Degrees of freedom are represented in a vector (tx, ty, tz, rx, ry, rz) where tx is translation in x, rx is rotation about the x axis, ty is translation in y, ry is rotation about the y axis, tz is translation in z and rz is rotation about the z axis. A weight vector is specified. The weight vector is multiplied element-wise with the update vector for gradient descent. This means that some parameters have a slower learning rate than others and so cannot contribute as much to the optimization.

In the embodiment of FIG. 1, the weight vector is (0, 1, 1, 1, 0, 0). An embodiment that allows minor variations in tx, ry and rz may be written as (δ, 1, 1, 1, δ, δ) where δ is much smaller than 1.

In another embodiment, the alignment of the symmetry planes as performed at stage 38 is used to initialize the registration procedure. The registration procedure is started in a position in which the symmetry planes are aligned as determined at stage 38. A weight vector may be (1, 1, 1, 1, 1, 1). In this embodiment, the registration procedure is constrained only in its initialization. The optimization, for example the gradient descent, is not constrained.

In some embodiments described above with reference to FIG. 2, the registrations performed are rigid registrations. In other embodiments, a non-rigid registration may be performed. The division of the registration into two parts may be applied to rigid and/or non-rigid registration. For example, the registration procedure of stage 40 of FIG. 2 may be performed using non-rigid registration. In some embodiments, symmetry planes are determined and the novel volume and atlas volume are aligned in accordance with the determined symmetry plane. A non-rigid registration procedure is performed to obtain a warp field relating the novel volume and the atlas volume. The novel volume and/or atlas volume may then be transformed using the determined warp field. In some embodiments, warp fields of the non-rigid registration are constrained such that material is not displaced from one hemisphere to the other. For example, any feature that starts in the left hemisphere must remain in the left hemisphere when transformed using a determined warp field. In some embodiments, deformations that cause material to cross the symmetry plane are allowed, but are penalized in the cost function of the registration optimization.

Figure 3:
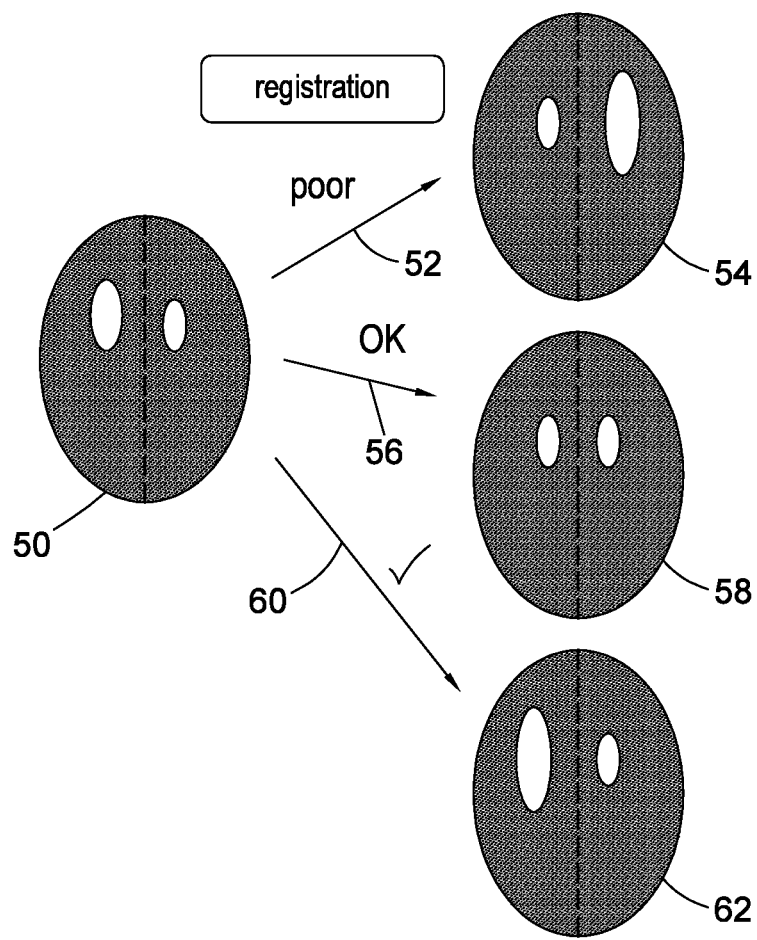
FIG. 3 is a schematic illustration of registration of volumes displaying asymmetry.

FIG. 3 is a schematic illustration of registration of volumes displaying asymmetry. Asymmetries may be present in medical imaging data. For example, is possible that an atlas patient may exhibit some asymmetries, which cause corresponding asymmetries to be present in an atlas volume. The asymmetries may be features that are of different size in each hemisphere. The asymmetries may be asymmetries in head shape.

In a scenario in which an atlas volume and a novel volume are registered, the presence of one or more asymmetries in the atlas volume may lead to difficulties in performing a registration between the atlas volume and the novel volume. Registration may be less robust. The registration circuitry 26 may not find such a good mapping between an atlas having one or more asymmetries, and a novel volume.

The novel volume may also have one or more asymmetries, for example features that are of different size in each hemisphere.

When performing a registration in which one or more volumes display asymmetry, registration results may be found to be biased. Subsequent algorithm results may be biased, for example consistently having a small error on one side. In some circumstances, bias may apply to individual algorithm results. In some circumstances, results of an algorithm may have a systematic bias.

In FIG. 3, an atlas volume 50 is representative of an atlas patient with asymmetry. A first novel volume 54 is representative of a novel patient having an asymmetry that is opposite to the asymmetry of the atlas patient. For example, if the atlas patient has a feature enlarged in the left hemisphere, the first novel patient has the feature enlarged in the right hemisphere.

A registration 52 is performed between the atlas volume 50 and the first novel volume 54. In the example shown in FIG. 3, the registration 52 between the atlas volume 50 and the first novel volume 54 is poor. The poor registration between atlas volume 50 and novel volume 54 is due to the differing asymmetries of the atlas volume 50 and the novel volume 54.

A second novel volume 58 is representative of a second novel patient. The second novel patient does not display asymmetry. For example, if the atlas patient has a feature enlarged in the left hemisphere, the feature is symmetric between the left hemisphere and the right hemisphere in the second novel patient.

A registration 56 is performed between the atlas volume 50 and the second novel volume 58. In the example shown in FIG. 3, the registration 56 between the atlas volume 50 and the novel volume 58 is adequate, but not good.

A third novel volume 62 is representative of a third novel patient. The third novel patient has an asymmetry in the same direction as the atlas patient. For example, if the atlas patient has a feature enlarged in the left hemisphere, the third novel patient also has the feature enlarged in the left hemisphere, although the feature may be enlarged by a different degree.

A registration 60 is performed between the atlas volume 50 and the third novel volume 62. In the example shown in FIG. 3, the registration 60 between the atlas volume 50 and the third novel volume 62 is good.

In summary, large asymmetries in features and/or head shape may cause difficulty in registration in some circumstances. The registration circuitry may not find a good mapping between, for example, an asymmetric atlas volume and a symmetric novel volume.

Figure 4:
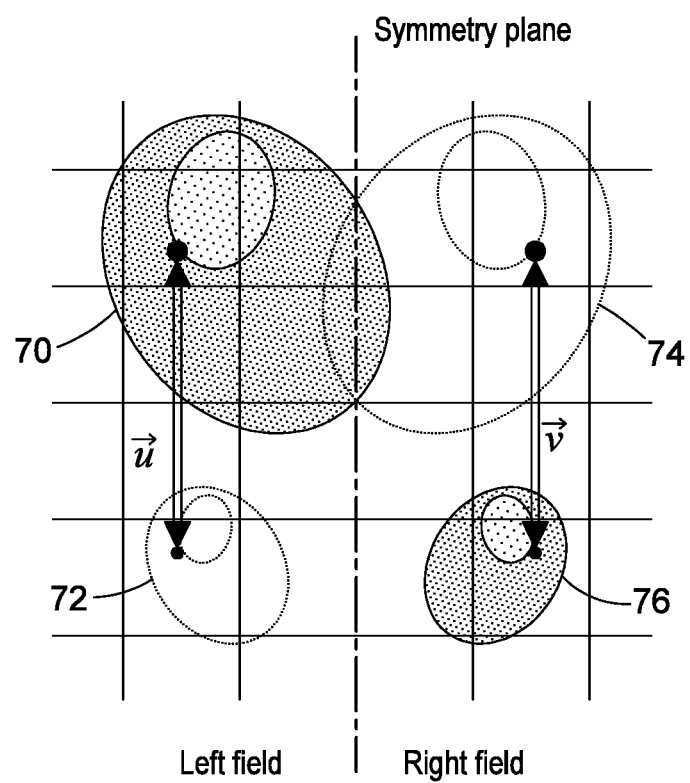
FIG. 4 is a schematic illustration of a use of non-rigid registration to compare hemispheres.

FIG. 4 is a schematic illustration of a use of non-rigid registration to compare hemispheres in a single patient. A symmetry plane divides a volume into a left hemisphere and a right hemisphere. A left feature 70 lies mostly, but not entirely, within the left hemisphere. A right feature 76 lies within the right hemisphere. In this example patient, the left feature 70 and right feature 76 are significantly different in size, and are also spatially offset.

A first non-rigid registration is performed. The first non-rigid registration registers the volume with a mirrored version of the volume in which right and left are reversed. The first non-rigid registration comprises an optimization of a first deformation field, which may also be referred to as a warp field. The first non-rigid registration may be performed on a single hemisphere of the volume and of the mirrored version of the volume.

The first non-rigid registration results in a first deformation field, which is illustrated in FIG. 4 as vector $\vec{u}$. The first deformation field warps left feature 70 to obtain a warped left feature 72 that has a similar shape, size and position to the mirrored version of right feature 76 in the mirrored version of the volume. The deformation field $\vec{u}$ may be used to obtain a comparison of the left feature 70 and right feature 76, or more generally to obtain a comparison of the left hemisphere and the right hemisphere of the volume.

A second non-rigid registration is performed. The second non-rigid registration registers the volume with a mirrored version of the volume in which right and left are reversed. The second non-rigid registration comprises an optimization of a deformation field, which may also be referred to as a warp field. The second non-rigid registration may be performed on a single hemisphere of the volume and of the mirrored version of the volume.

The second non-rigid registration results in a second deformation field, which is illustrated in FIG. 4 as vector $\vec{v}$. The second deformation field warps right feature 76 to obtain a warped right feature 74 that has a similar shape, size and position to the mirrored version of left feature 70 in the mirrored version of the volume. The deformation field $\vec{v}$ may be used to obtain a comparison of the left feature 70 and right feature 76, or more generally to obtain a comparison of the left hemisphere and the right hemisphere of the volume.

It may be seen that each of the first non-rigid registration $\vec{u}$ and the second non-rigid registration $\vec{v}$ involves a large deformation. The left feature is much larger than the right feature and is differently positioned. Therefore, deforming the left feature to correspond to the right feature or vice versa requires a large deformation.

It is found that, if the left hemisphere has significant size differences to the right hemisphere, non-rigid registration may produce artifacts due to large warping.

It is hypothesized that creating a more symmetric version of a volume may result in fewer artifacts. It is also hypothesized that the more symmetric version of the volume may be better for training models (for example, CNNs) and that the more symmetric version of the volume may be better for rigidly registering to an atlas.

In some embodiments, the symmetry circuitry 24 performs a symmetrization procedure in which a volume is processed to obtain a more symmetric version of the volume. The more symmetric version of the volume may be used in registration, or otherwise processed. Two different methods of performing a symmetrization procedure are described below with reference to FIG. 5 and FIG. 6a respectively.

Figure 5:
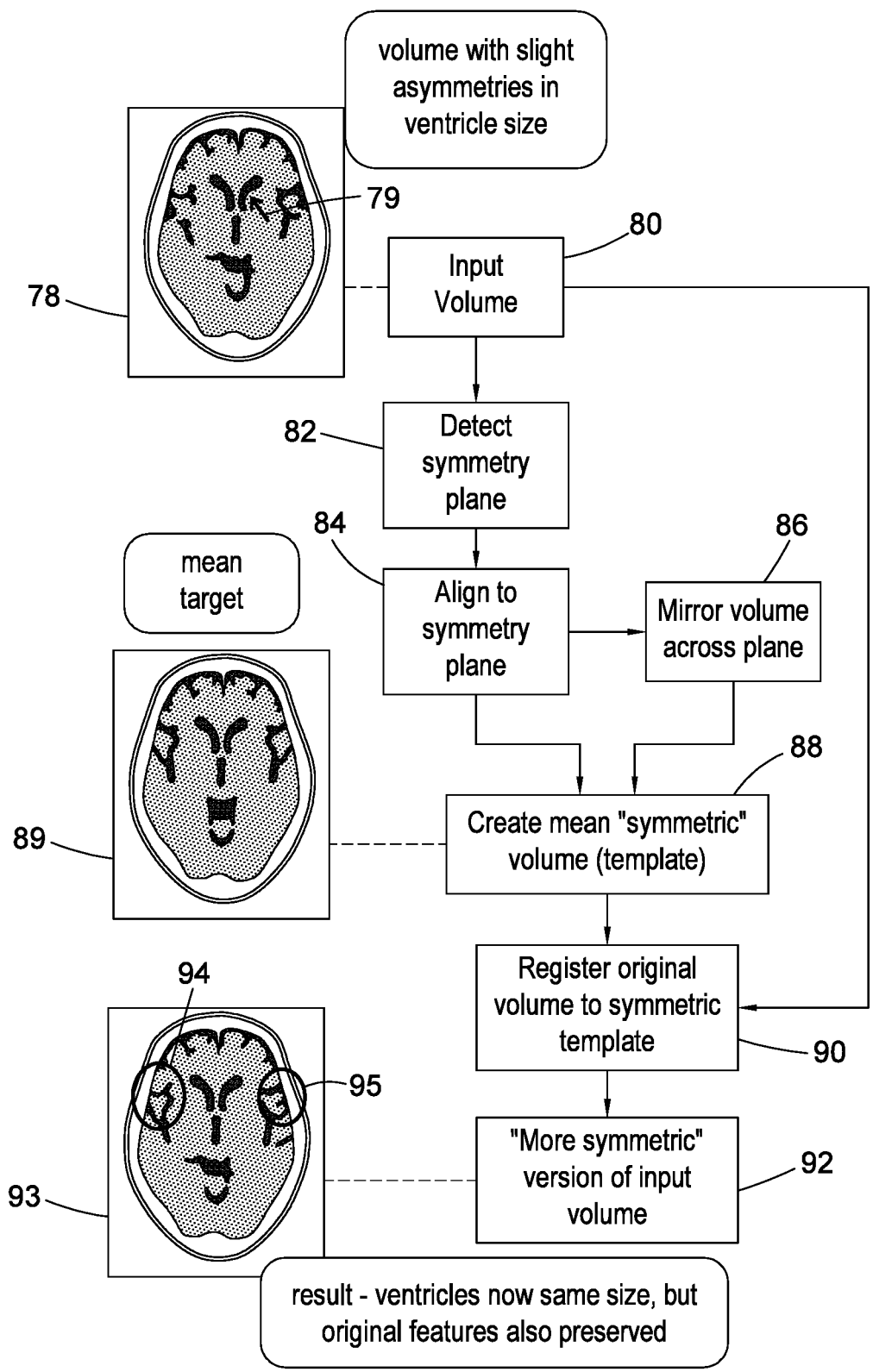
FIG. 5 is a flow chart illustrating in overview a method in accordance with an embodiment.

FIG. 5 is a flow chart illustrating in overview a method of an embodiment.

At stage 80, the symmetry circuitry receives an input volume. The input volume is a volume with slight asymmetries in ventricle size. FIG. 5 illustrates an image 78 rendered from the input volume, in which the asymmetry in ventricle size is highlighted by an arrow 79.

At stage 82, the symmetry circuitry 24 detects a symmetry plane of the input volume. The symmetry circuitry 24 detects the symmetry plane using a symmetry detection procedure, for example the symmetry detection procedure described above with reference to stage 32 of FIG. 2.

At stage 84, the registration circuitry 26 performs an alignment procedure in which the registration circuitry 26 transforms the input volume such that the determined symmetry plane is aligned to a y-z plane positioned in the middle of the x axis.

At stage 86, the registration circuitry 26 mirrors the input volume across the symmetry plane to obtain a mirrored volume. It is noted that the mirrored volume of stage 86 is not the same as the mirrored novel volume described above with reference to stage 32 of FIG. 2. The mirrored volume of stage 86 is mirrored across the determined symmetry plane (which is now aligned to a y-z plane), instead of being mirrored across an arbitrary plane as part of the symmetry detection procedure.

At stage 88, the symmetry circuitry 24 combines the input volume with the mirrored volume to obtain a mean volume, which may also be described as a mean target volume. The mean volume is entirely symmetrical around the symmetry plane.

In the embodiment of FIG. 5, the combining of the input volume with the mirrored volume comprises averaging the input volume with the mirrored volume. For each voxel of the mean target volume, an intensity for the voxel is obtained by averaging the voxel intensity in the input volume and the voxel intensity in the mirrored volume. The averaging of intensities of the input volume and the mirrored volume causes the mean volume to appear slightly blurred.

FIG. 5 illustrates an image 89 rendered from the mean volume, which is symmetrical around the symmetry plane.

At stage 90, the registration circuitry 26 registers the input volume to the mean volume by performing a non-rigid registration, for example using a symmetric demons method. The mean volume provides a symmetric target. The registration circuitry 26 performs an optimization to obtain a deformation field relating the input volume and the mean volume. The registration circuitry 26 then transforms the input volume using the deformation field to obtain a more symmetric version of the input volume.

At stage 92, the registration circuitry 26 outputs the more symmetric version of the input volume. The more symmetric version of the input volume may be referred to as a symmetrized volume. In the more symmetric version of the input volume, the ventricles are now the same size, but original features are preserved.

FIG. 5 illustrates an image 93 rendered from the symmetrized volume. Two circles 94, 95 highlight original features of the input volume that have been preserved.

The method of FIG. 5 creates a more symmetric version of an input volume that still retains certain features of the input volume. The more symmetric version may be used to perform a registration. In some circumstances, a registration using the more symmetric version of the input volume may be more robust than a registration using the original input volume.

The more symmetric version may be used for training a model, for example a CNN.

Figure 6A:
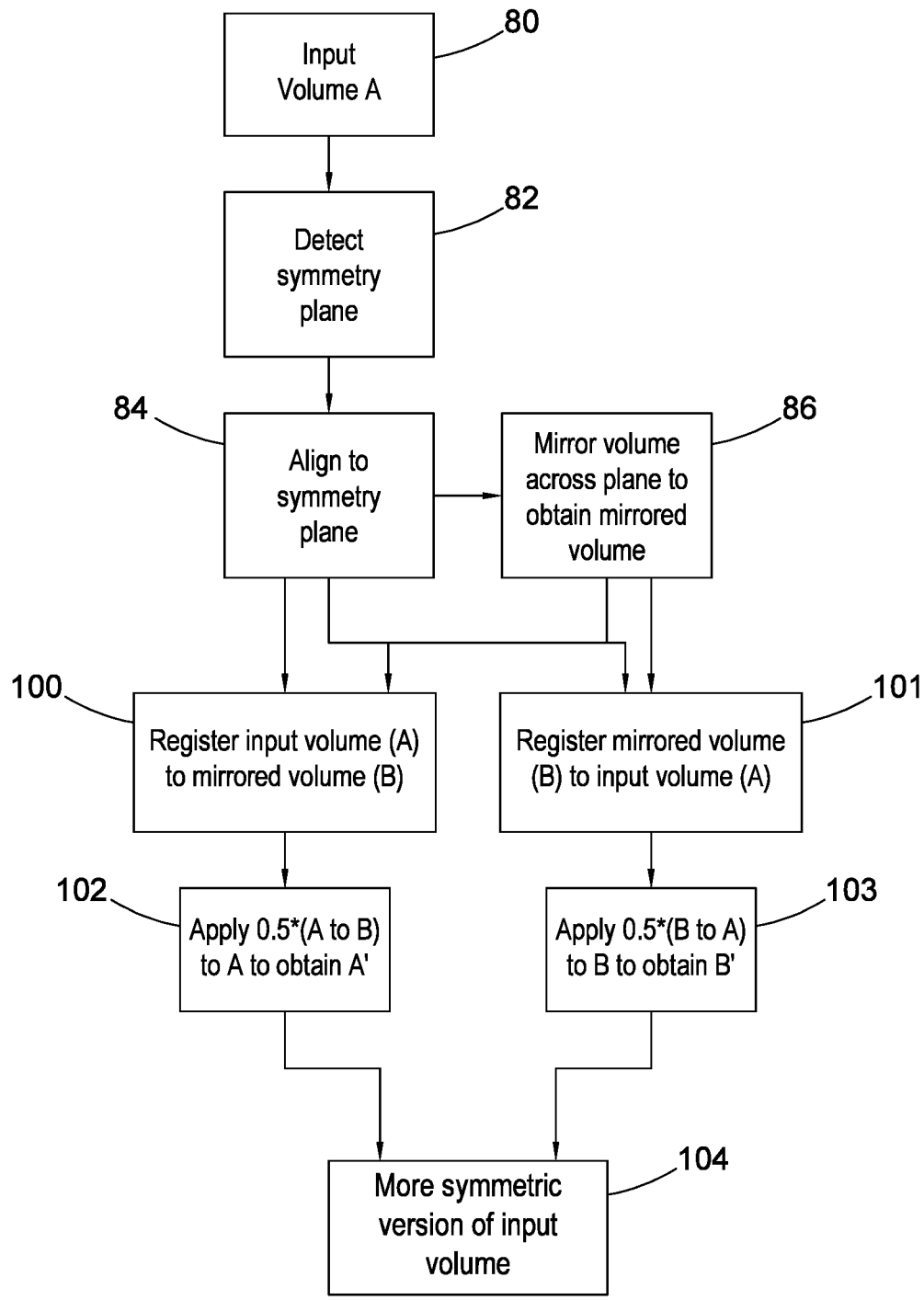
FIG. 6a is a flow chart illustrating in overview a method in accordance with an embodiment.

FIG. 6a illustrates an alternative method of creating a more symmetric version of an input volume. Stages 80 to 86 are the same as stages 80 to 86 of FIG. 5. At stage 80, the symmetry circuitry 24 receives an input volume. At stage 82, the symmetry circuitry 24 detects a symmetry plane of the input volume using a symmetry detection procedure. At stage 84, the registration circuitry 26 aligns that input volume using the detected symmetry plane, such that the symmetry plane is a y-z plane in the middle of the x axis. At stage 86, the symmetry circuitry 24 mirrors the input volume across the symmetry plane to obtain a mirrored volume.

The input volume is denoted A and the mirrored volume is denoted B.

At stage 100, the registration circuitry 26 registers A to B to obtain a transform from A to B. Any suitable non-rigid registration method may be used to obtain a warp field transforming A to B. In the present embodiment, the registration from A to B is performed on a single hemisphere of the input volume A and mirrored volume B. In other embodiments, the registration may be performed on the entirety of the input volume A and the mirrored volume B. The registration may be constrained to prohibit or limit deformation across the symmetry plane.

At stage 101, the registration circuitry 26 registers B to A to obtain a transform from B to A. Any suitable non-rigid registration method may be used to obtain a warp field transforming B to A. For example, the same non-rigid registration method may be used for stage 100 and stage 101. In the present embodiment, the registration from B to A is performed on a single hemisphere of the input volume A and mirrored volume B. In other embodiments, the registration may be performed on the entirety of the input volume A and the mirrored volume B.

In other embodiments, the registration circuitry 26 obtains the transform from B to A by inverting the transform from A to B that was obtained at stage 100. However, in some embodiments, registering B to A instead of inverting the A to B transform may provide greater stability and/or robustness.

At stage 102, the registration circuitry 26 multiplies the A to B transform of stage 100 by 0.5, thereby halving the A to B transform, and uses the 0.5 transform to transform input volume A to obtain a volume A'.

At stage 103, the registration circuitry 26 multiplies the B to A transform by 0.5, thereby halving the B to A transform, and uses the 0.5 transform to transform input volume B to obtain a volume B'.

A' and B' have been transformed to be in a shared space, which may be referred to as a halfway space.

At stage 104, the registration circuitry 26 obtains a more symmetric version of input volume A by combining volume A' and volume B', and outputs the more symmetric version of input volume A. In the present embodiment, one half of the more symmetric volume is obtained from volume A' and the other half of the more symmetric volume is obtained from volume B'. The more symmetric volume may be approximately symmetric but not exactly symmetric. Differences may result from slight differences in how each independent registration evolves.

In other embodiments, the more symmetric version may be volume A', a mirrored version of volume B', or any suitable combination of A' and B'. For example, A' and B' may be averaged.

In some embodiments, a transform from A to B is obtained. The transform from A to B is halved and the halved transform is applied to A to obtain a mid state. The halved transform is inverted to obtain a halved inverted transform, which is then applied to B.

In other embodiments, only one of stages 100 and 101 is performed. A transform from A to B is multiplied by 0.5 and applied to A to obtain transformed volume A', or a transform from B to A is multiplied by 0.5 and applied to B to obtain transformed volume B'. A' or is a more symmetric version of input volume A. B' is a more symmetric version of mirrored volume B.

In some embodiments, a transform from A to B is applied to one hemisphere, and a transform from B to A is applied to the other hemisphere.

Figure 6B:
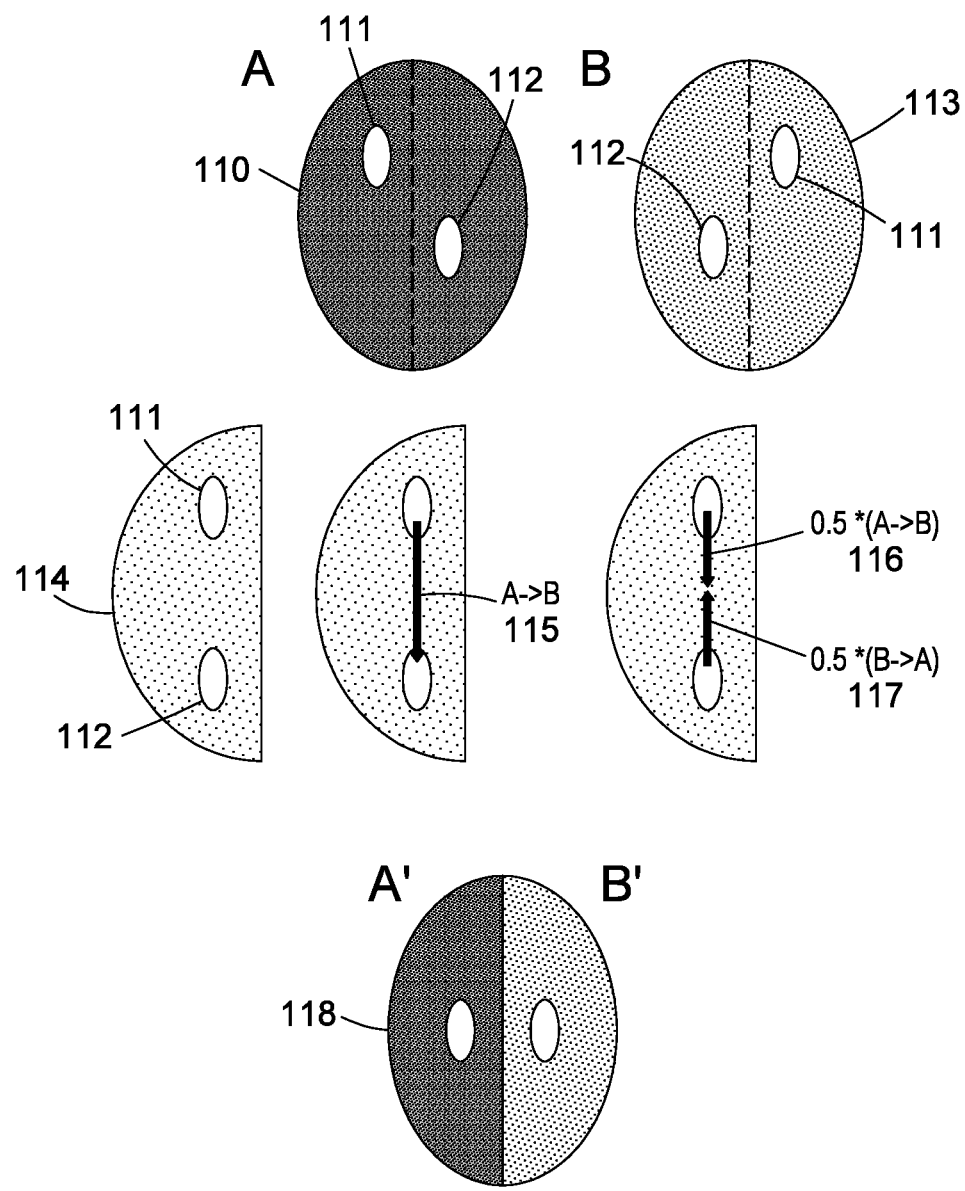
FIG. 6b is a schematic illustration showing the application of the method of FIG. 6a to an asymmetric volume.

FIG. 6b illustrates an example of applying a method according to FIG. 6b to an asymmetric volume 110, which is also denoted as A. In the method of FIG. 6b, the registrations of stages 100 and 101 are each applied to a single hemisphere of A and a single hemisphere of B. By applying the registration to a single hemisphere, the registration may be more efficient.

Asymmetric volume 110 is aligned in accordance with a symmetry plane, which is shown by a dashed line in FIG. 6b. Asymmetric volume 110 comprises a first feature 111 in a first hemisphere on a left side of the symmetry plane and a second feature 112 in a second hemisphere on a right side of the symmetry plane. The first feature 111 and second feature 112 are features that may normally be expected to be approximately symmetric, but which exhibit an asymmetry in volume A.

The asymmetric volume 110 is mirrored across the symmetry plane to obtain a mirrored volume 113, which is denoted as B. In the mirrored volume 113, the first feature 111 appears on the right side and the second feature 112 appears on the left side.

Registration is performed using a left side of volume 110 and a left side of mirrored volume 113, which are shown overlaid as hemisphere 114 of FIG. 6b, displaying first feature 111 and the mirrored version of second feature 112.

Arrow 115 represents a transform obtained from a registration of A to B. Arrow 116 represents a transform that is 0.5 times the transform obtained from the registration of A to B. Arrow 117 represents a transform that is 0.5 times a transform obtained from the registration of B to A.

A transformed, more symmetric volume 118 comprises a left side, A', obtained by transforming volume 110 by 0.5 times the transform obtained from the registration of A to B, and a right side, B', obtained by transforming mirrored volume 113 by 0.5 times the transform obtained from the registration of B to A.

In other embodiments, any suitable method may be used to obtain a symmetrized volume.

In a further embodiment, an input volume and mirrored volume are provided to the registration circuitry 26. The registration circuitry 26 evolves a deformation in two halves from an output symmetry space. The deformation is evolved forward to one hemisphere and equal and opposite to the other hemisphere. It may be considered that the deformation comprises a first deformation field in a first hemisphere and a second deformation field in a second hemisphere, where the second deformation field is constrained to be equal in size and opposite in direction to the first deformation field.

The registration circuitry 26 computes a similarity metric between the left and right hemispheres directly in the output symmetry space. The registration circuitry 26 optimizes the similarity metric between the left and right hemispheres. The registration circuitry 26 outputs a transform that is representative of the deformation that optimizes the similarity metric. The deformation comprises a first deformation in a first direction in the left hemisphere and a second deformation in a second direction in the right hemisphere, wherein the second direction is opposite to the first direction and the first and second deformation are equal in size. The registration circuitry 26 applies the deformation to the input volume to obtain a symmetrized volume.

Figure 7:
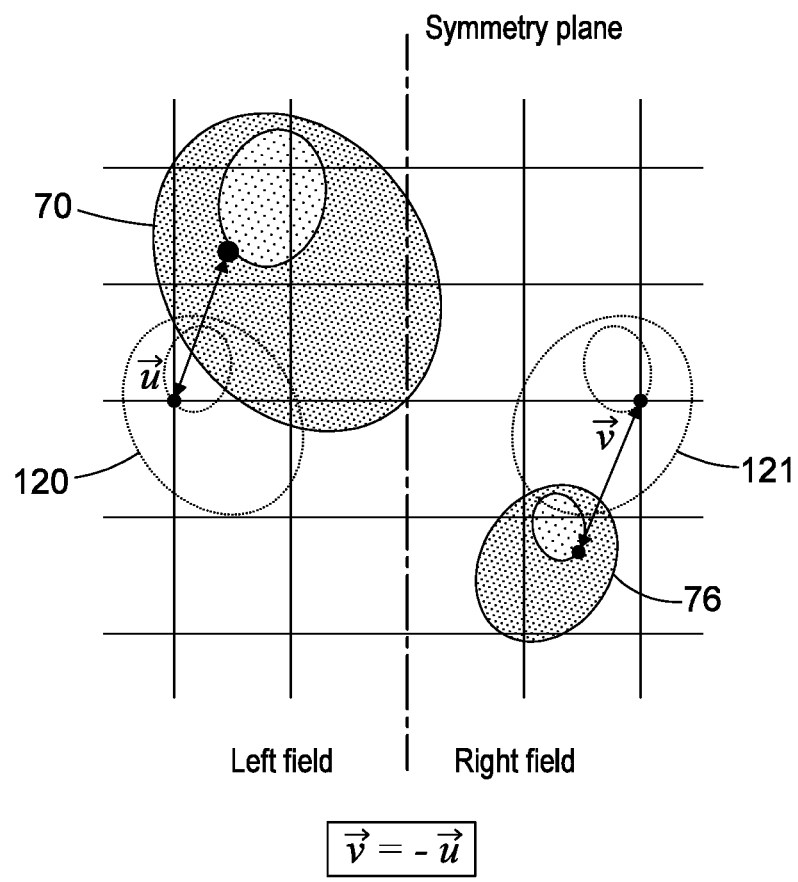
FIG. 7 is a schematic illustration of a use of non-rigid registration to compare hemispheres in accordance with an embodiment.

FIG. 7 is a schematic illustration of an input volume that is transformed to obtain a symmetrized volume. A symmetry plane divides the input volume into a left hemisphere and a right hemisphere. A left feature 70 lies mostly, but not entirely, within the left hemisphere. A right feature 76 lies within the right hemisphere. In this example patient, the left feature 70 and right feature 76 are significantly different in size, and are also spatially offset.

A first deformation field warps left feature 70 to obtain a warped left feature 120. The first deformation field is illustrated in FIG. 7 as vector $\vec{u}$. A second deformation field warps right feature 76 to obtain a warped left feature 121. The second deformation field is illustrated in FIG. 7 as vector $\vec{v}$. The first deformation field and second deformation field are equal and opposite, which may be written as $\vec{v} = -\vec{u}$.

By using equal and opposite deformations, the left feature 70 and right feature 76 are each warped into corresponding positions which may be considered to be intermediate between the original position of the left feature 70 and the original position of right feature 76. The warped left feature 120 and the warped right feature 121 have the same size, which is midway in size between the original size of the left feature 70 and the original size of the right feature 76.

In this embodiment and in the embodiment described above with reference to FIGS. 6a and 6b, the deformations used are smaller than deformations that would be used to warp the left feature 70 to correspond with the right feature 76 or vice versa, for example the deformations illustrated in FIG. 4. By deforming both features by a smaller amount, artifacts caused by the warping may be reduced.

Figure 8:
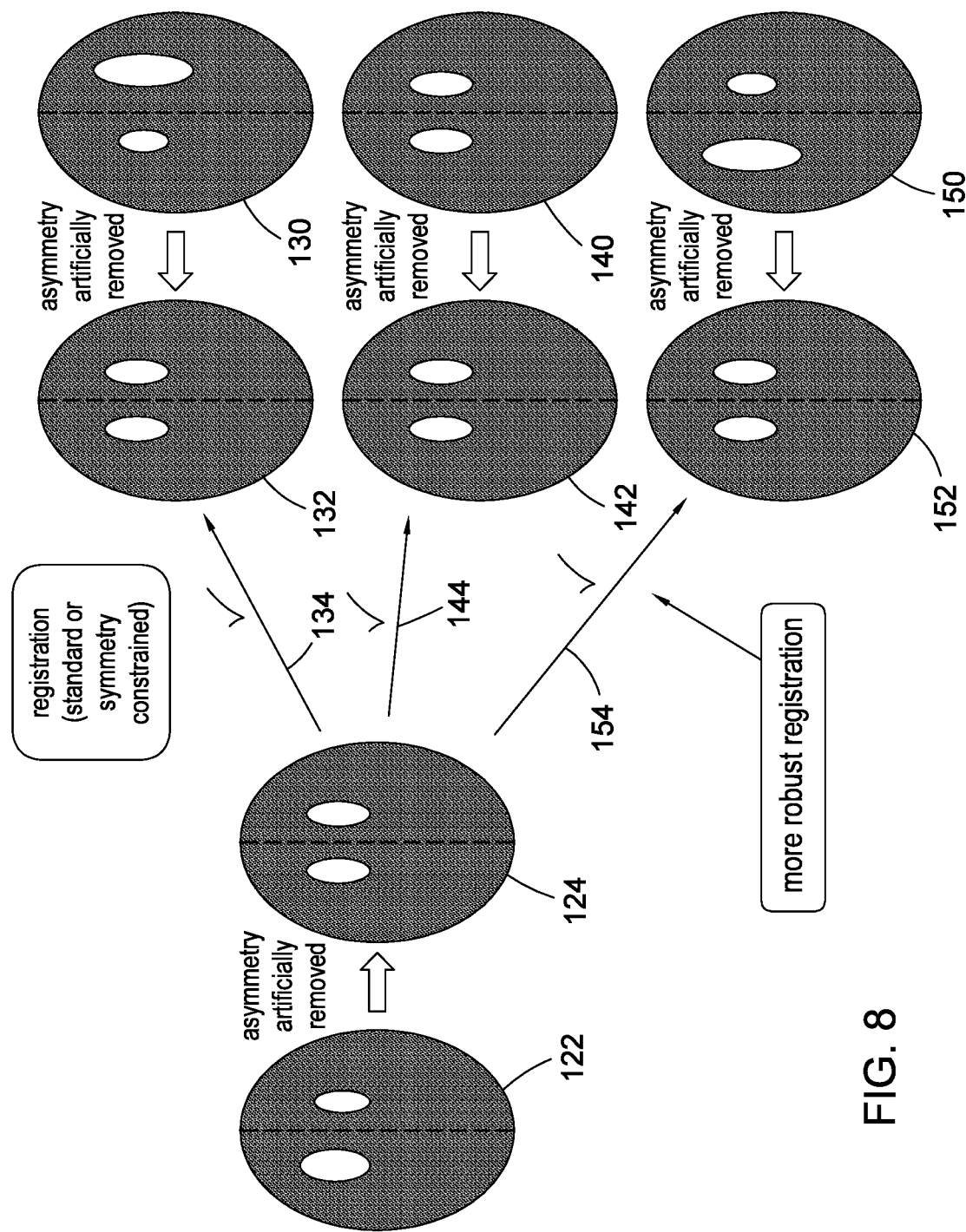
FIG. 8 is a schematic illustration of registration of volumes displaying asymmetry in accordance with an embodiment.

FIG. 8 is a schematic illustration of registration of a novel volume with an atlas volume where the atlas volume has been symmetrized, for example using the method of FIG. 5 or FIG. 6a as described above.

A atlas volume 122 is representative of an atlas patient with asymmetry. The atlas volume 122 is processed to obtain a symmetrized version 124 of the atlas volume 122. For example, the atlas volume 122 may be symmetrized using the method of FIG. 5 or FIG. 6. The symmetrization artificially removes an asymmetry in the atlas volume 122. The asymmetry may be a difference in size of certain features, for example a difference of size between right and left ventricles.

A first novel volume 130 is representative of a novel patient having an asymmetry that is opposite to the asymmetry of the atlas patient. For example, if the atlas patient has a feature enlarged in the left hemisphere, the first novel patient has the feature enlarged in the right hemisphere.

The first novel volume 130 is processed to obtain a symmetrized version 132 of the first novel volume 130. For example, the first novel volume 130 may be symmetrized using the method of FIG. 5 or FIG. 6. The symmetrization artificially removes an asymmetry in the first novel volume 130.

A registration 134 is performed between the symmetrized version 124 of the atlas volume and the symmetrized version 132 of the first novel volume. The registration 134 may be a standard registration or a symmetry constrained registration, for example a registration in which symmetry planes are aligned as described above with reference to FIG. 2.

A second novel volume 140 is representative of a second novel patient. The second novel patient does not display asymmetry. For example, if the atlas patient has a feature enlarged in the left hemisphere, the feature is symmetric between the left hemisphere and the right hemisphere in the second novel patient. The second novel volume 140 is processed to obtain a symmetrized version 142 of the second novel volume 140.

A registration 144 is performed between the symmetrized version 124 of the atlas volume and the symmetrized version 142 of the second novel volume. The registration 144 may be a standard registration or a symmetry constrained registration, for example a registration in which symmetry planes are aligned as described above with reference to FIG. 2.

A third novel volume 150 is representative of a third novel patient. The third novel patient has an asymmetry in the same direction as the atlas patient. For example, if the atlas patient has a feature enlarged in the left hemisphere, the third novel patient also has the feature enlarged in the left hemisphere, although the feature may be enlarged by a different degree.

The third novel volume 150 is processed to obtain a symmetrized version 152 of the third novel volume 150. The symmetrization artificially removes an asymmetry in the third novel volume 150.

A registration 154 is performed between the symmetrized version 124 of the atlas volume and the symmetrized version 152 of the second novel volume. The registration 154 may be a standard registration or a symmetry constrained registration, for example a registration in which symmetry planes are aligned as described above with reference to FIG. 2.

It is found that all three registrations 134, 144 and 154 have good results. By artificially removing asymmetry in the atlas volume 122 and in the novel volumes 130, 140, 150, more robust registration may be achieved.

After registration, the image processing circuitry 28 may use a registration result to perform any suitable image processing task, for example to perform a segmentation or a scoring, for example an ASPECTS scoring. Image processing may be performed on the novel volume 130 and/or on the symmetrized version 124.

The registration found for the symmetrized volume 124 may be used to align the novel volume 130. A segmentation of the atlas volume may be transferred to the novel volume using the registration of the novel volume and the atlas volume. The image processing circuitry 28 may apply a trained model to the registered volumes to perform the image processing task.

Features of any of the embodiments described above may be combined with features of any other embodiment. For example, a symmetrized volume that is obtained using the method of FIG. 5 or the method of FIG. 6 may be used as an input to a registration performed using the method of FIG. 2. In some embodiments, an atlas volume is symmetrized and is registered with a novel volume that is not symmetrized. In other embodiments, two symmetrized volumes may be registered together.

In embodiments described above, the image data sets comprise medical image data, for example CT data. In other embodiments, the image data sets may comprise any suitable form or forms of medical image data, for example CT data, MR data, X-ray data, PET data, or SPECT data. The image data sets may be obtained by imaging any suitable anatomical region of any patient or other subject, using any suitable imaging modality or modalities. The patient or other subject may be human or animal.

In further embodiments, the image data sets may comprise any form of image data, which may not be medical. For example, the image data may comprise engineering visualization data or seismic data.

Certain embodiments provide a medical image processing apparatus comprising processing circuitry configured to: receive first volume data and second volume data, set first symmetry plane to the first volume data and second symmetry plane to the second volume data, conduct a registration of the first volume data and the second volume data based on the first symmetry plane and the second symmetry plane.

The registration may be configured to a first registration and a second registration, wherein the first registration is configured to conduct a registration of a first position corresponding to a first direction, a second rotation angle which rotation axis corresponds to a second direction and orthogonal to the first direction, and third rotation angle which rotation axis corresponds to a third direction and orthogonal to the first direction and the third direction.

The second registration may be configured to conduct a registration of a second position corresponding to the second direction, a third position corresponding to the third position, and a first rotation angle which rotation axis is corresponds to the first direction.

Certain embodiments provide a medical image processing apparatus comprising processing circuitry configured to: receive volume data, set a symmetry plane to the volume data, generate a mirror volume data by mirror copying the volume data based on the symmetry plane, generate a mean volume data by averaging the volume data and the mirror volume data, conduct a non-rigid registration of the volume data based on the mean volume data.

Certain embodiments provide a medical image processing apparatus comprising processing circuitry configured to: receive one or more volumes; automatically detect the symmetry plane of said volume(s); use the symmetry plane(s) to constrain a registration procedure (to improve the quality and robustness).

The volumes acquired may be of the head.

Two distinct volumes may be received to be registered together, either rigidly or non-rigidly.

The symmetry planes of the two volumes may be constrained to be coincident during the registration optimization.

The symmetry planes of the two volumes may not be constrained to be coincident, but may be penalized for deviations during the optimization.

The symmetry planes of the two volumes may be aligned for the registration initialization only.

One volume may be received to be "symmetrized" (made more symmetric).

A "mean mirrored image" may be used as a symmetric template for non-rigid registration.

The deformation field may be evolved in two halves for each hemisphere.

One volume may be received to be non-rigidly registered to its mirror volume.

The registration field may only be obtained for one hemisphere then inverted and mirrored across the symmetry plane.

Deformations across the symmetry plane may be penalized in the cost function of the registration optimization.

Symmetrization and constrained registration may be combined.

Certain embodiments provide a medical image processing apparatus comprising processing circuitry configured to:
receive a medical image volume, wherein the medical image volume is representative of an anatomical region of a subject;
automatically determine a symmetry plane of said medical image volume; and
perform a registration procedure between the medical image volume and a further volume, wherein the determined symmetry plane is used to constrain the registration procedure.

The anatomical region may be the head.

The registration procedure may comprise aligning the determined symmetry plane of said medical image volume with a symmetry plane of the further volume.

The processing circuitry may be further configured to automatically determine the symmetry plane of the further volume.

The aligning of the determined symmetry plane of said medical image volume with the symmetry plane of the further volume may comprise constraining the determined symmetry plane of said medical image volume to be coincident with the symmetry plane of the further volume.

The registration procedure may comprise an optimization. The aligning of the determined symmetry plane of said medical image volume with the symmetry plane of the further volume may comprise obtaining a measure of deviation of the determined symmetry plane of said medical image volume and the symmetry plane of the further volume. The optimization may be dependent on the measure of deviation.

The registration procedure may comprise a rigid registration.

The registration procedure may comprise a non-rigid registration.

The processing circuitry may be further configured to: obtain a mirrored volume by mirroring the medical image volume relative to the determined symmetry plane; and combine the medical image volume and the mirrored volume to obtain a target volume, optionally wherein the target volume is a mean of the medical image volume and the mirrored volume.

The registration procedure may comprise registering the target volume and the further volume.

The processing circuitry may be further configured to register the medical image volume and the target volume.

The registration procedure may comprise using the target volume as a symmetric template for non-rigid registration.

The processing circuitry may be further configured to evolve a deformation field in a first hemisphere on a first side of the determined symmetry plane and in a second hemisphere on a second side of the determined symmetry plane.

The processing circuitry may be further configured to determine a value for similarity metric between the first hemisphere and the second hemisphere.

The further volume may be a mirrored version of the medical image volume. The registration procedure may comprise a non-rigid registration of the medical image volume and the further volume.

The non-rigid registration may comprise obtaining a registration field for a first hemisphere on a first side of the determined symmetry plane and inverting and mirroring the registration field for a second hemisphere on a second side of the determined symmetry plane.

Deformations across the symmetry plane may be penalized in a cost function of a registration optimization of the registration procedure.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image processing apparatus comprising processing circuitry configured to:
  receive first volume data and second volume data;
  set a first symmetry plane for the first volume data and a second symmetry plane for the second volume data; and
  conduct a registration of the first volume data and the second volume data based on the first symmetry plane and the second symmetry plane, wherein
  the registration comprises an alignment procedure and a constrained registration procedure, and
  the alignment procedure comprises determining:
    a first translation corresponding to a first direction;
    a second rotation angle having a rotational axis corresponding to a second direction, wherein the second direction is orthogonal to the first direction; and
    a third rotation angle having a rotational axis corresponding to a third direction, wherein the third direction is orthogonal to the first direction and to the second direction.

2. The medical image processing apparatus according to claim 1, wherein the constrained registration procedure comprises determining:
  a second translation corresponding to the second direction;
  a third translation corresponding to the third direction; and
  a first rotation angle having a rotational axis corresponding to the first direction.

3. The medical image processing apparatus according to claim 2, wherein the first translation, second rotation angle and third rotation angle determined in the alignment procedure are held as fixed values when performing the constrained registration procedure.

4. The medical image processing apparatus according to claim 1, wherein the alignment procedure aligns the first symmetry plane of the first volume data to be coincident with the second symmetry plane of the second volume data.

5. The medical image processing apparatus according to claim 1, wherein the constrained registration procedure is performed using a constraint in which the first symmetry plane of the first volume data is constrained to be coincident with the second symmetry plane of the second volume data.

6. The medical image processing apparatus according to claim 1, wherein the constrained registration procedure comprises an optimization, wherein the optimization is dependent on a measure of deviation between the first symmetry plane of the first volume data and the second symmetry plane of the second volume data.

7. The medical image processing apparatus according to claim 1, wherein the alignment procedure transforms the first volume data and/or the second volume data such that the first symmetry plane of the first volume data is coincident with the second symmetry plane of the second volume data, and the processing circuitry is configured to use the transformed first volume data and/or second volume data to initialize the constrained registration procedure.

8. The medical image processing apparatus according to claim 1, wherein the constrained registration procedure comprises an optimization, and wherein displacement of material across the first symmetry plane and/or second symmetry plane is penalized in the optimization.

9. The medical image processing apparatus according to claim 1, wherein the alignment procedure comprises transforming the first volume data and/or the second volume data such that the symmetry plane of the first volume data and the symmetry plane of the second volume data are each aligned in accordance with a contralateral orientation.

10. The medical image processing apparatus according to claim 1, wherein the setting of the first symmetry plane comprises mirroring the first volume data to obtain mirrored first volume data, registering the first volume data and the mirrored first volume data to obtain a transform, and determining the first symmetry plane based on the determined transform.

11. The medical image processing apparatus according to claim 1, wherein the processing circuitry is further configured to process the first volume data in dependence on the registration, the processing comprising at least one of segmentation, scoring, comparison of a first part of the first volume data with a second part of the first volume data.

12. The medical image processing apparatus according to claim 11, wherein the processing of the volume data is performed using a trained model.

13. The medical image processing apparatus according to claim 1, wherein the first volume data is representative of an anatomical region of a subject, and the first symmetry plane is a symmetry plane of at least one anatomical structure in the anatomical region.

14. The medical image processing apparatus according to claim 13, wherein the anatomical region is at least part of a head.

15. The medical image processing apparatus according to claim 1, wherein the registration comprises a rigid registration.

16. The medical image processing apparatus according to claim 1, wherein the registration comprises a non-rigid registration.

17. The medical image processing apparatus according to claim 1, wherein the first volume data comprises novel data and the second volume data comprises atlas data.

18. A medical image processing method comprising:
receiving first volume data and second volume data;
determining a first symmetry plane for the first volume data and a second symmetry plane for the second volume data; and
conducting a registration of the first volume data and the second volume data based on the first symmetry plane and the second symmetry plane, wherein
conducting the registration comprises an alignment procedure and a constrained registration procedure, and
the alignment procedure comprises determining:
a first translation corresponding to a first direction;
a second rotation angle having a rotational axis corresponding to a second direction, wherein the second direction is orthogonal to the first direction; and
a third rotation angle having a rotational axis corresponding to a third direction, wherein the third direction is orthogonal to the first direction and to the second direction.

* * * * *